United States Patent
Hamada

(10) Patent No.: US 8,289,478 B2
(45) Date of Patent: Oct. 16, 2012

(54) BACKLIGHT UNIT AND LIQUID CRYSTAL DISPLAY DEVICE

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 196 days.

(21) Appl. No.: 12/920,496

(22) PCT Filed: Nov. 4, 2008

(86) PCT No.: PCT/JP2008/070007
§ 371 (c)(1),
(2), (4) Date: Sep. 1, 2010

(87) PCT Pub. No.: WO2009/118941
PCT Pub. Date: Oct. 1, 2009

(65) Prior Publication Data
US 2011/0007239 A1 Jan. 13, 2011

(30) Foreign Application Priority Data
Mar. 28, 2008 (JP) ................................ 2008-087283

(51) Int. Cl.
*G02F 1/1335* (2006.01)
(52) U.S. Cl. ........................................................ 349/65
(58) Field of Classification Search .................. 349/65, 349/62, 58
See application file for complete search history.

(56) References Cited

U.S. PATENT DOCUMENTS

| 7,834,548 B2* | 11/2010 | Jousse et al. ................. 313/506 |
| 2005/0253151 A1 | 11/2005 | Sakai et al. |
| 2005/0264716 A1 | 12/2005 | Kim et al. |
| 2007/0139931 A1 | 6/2007 | Kim et al. |
| 2007/0284597 A1 | 12/2007 | Nawashiro et al. |

FOREIGN PATENT DOCUMENTS

| EP | 1 748 250 A1 | 1/2007 |
| JP | 2006-011242 A | 1/2006 |
| JP | 2006-302581 A | 11/2006 |
| JP | 2007-317621 A | 12/2007 |
| JP | 2008-041645 A | 2/2008 |
| JP | 2008-186914 A | 8/2008 |
| RU | 49328 U1 | 11/2005 |
| RU | 2 295 174 C2 | 3/2007 |
| RU | 2 306 587 C1 | 9/2007 |
| RU | 2 309 441 C1 | 10/2007 |
| WO | 2007/052842 A1 | 5/2007 |

OTHER PUBLICATIONS

Official Communication issued in International Patent Application No. PCT/JP2008/070007, mailed on Feb. 3, 2009.
English translation of Official Communication issued in corresponding Russian Patent Application No. 2010139763/07, filed on Apr. 11, 2008.

* cited by examiner

*Primary Examiner* — James Dudek
(74) *Attorney, Agent, or Firm* — Keating & Bennett, LLP

(57) ABSTRACT

Disclosed is a backlight unit (49) comprising a light-emitting unit (UT) and a light guide plate (42) for receiving light from the light-emitting unit (UT). In this backlight unit (49), a light-receiving surface (42S) of the light guide plate (42) receiving light from an LED (12) is provided with a recess (DH) for housing an FFC (14) which connects mounted boards (11) arranged side by side.

18 Claims, 8 Drawing Sheets

BACKLIGHT UNIT AND LIQUID CRYSTAL DISPLAY DEVICE

TECHNICAL FIELD

The present invention relates to a backlight unit that provides light to a non-self-luminous panel such as a liquid crystal display panel, and to a liquid crystal display device that includes the backlight unit.

BACKGROUND ART

There have conventionally been developed various backlight units that provide light to a liquid crystal display panel (a non-self-luminous display panel) of a liquid crystal display device. An example of the backlight units is, as shown in FIG. 9, a backlight unit 149 of the side light type (a backlight unit 149 of a type which light enters a side surface 142S of a light guide plate 142) disclosed in Patent Document 1.

In the backlight unit 149, light to be provided to a liquid crystal display panel 159 is obtained from an LED (light emitting diode) 112. The LED (light-emitting element) 112 is compact, and is commonly used in backlight units 149 available these days. Particularly, in mobile tools such as portable terminals, the LED 112 in particular is used commonly.

As shown in a perspective view of FIG. 10, the LED 112 is often mounted on a mounting board 111 having flexibility (such a mounting board 111 on which the LED 112 is mounted is also referred to as an LED module mj). If the mounting board 111 having flexibility is excessively long, the mounting board 111 flexes more than necessary.

For example, when the LED module mj is mounted in a backlight unit 149 for a notebook personal computer (notebook PC) which is larger than a cellular phone, the mounting board 111 may flex. Specifically, during manufacture of the notebook PC, a mounting board 111 with an excessive length may flex. Moreover, when the mounting board 111 flexes, the LED 112 may come off from the mounting board 111, and a defective product may be produced.

One approach to avoid such a situation is, as shown in a perspective view of FIG. 11A, connecting a relatively short mounting board 111 by use of a flexible flat cable (FFC) 114. In this way, the mounting board 111 is less likely to flex excessively.

Patent Document 1: JP-A-2006-11242

DISCLOSURE OF THE INVENTION

Problems to be Solved by the Invention

However, with such a series of LED modules mj, as shown in a plan view of FIG. 11B, the FFC (connection conductor) 114 touches the side surface (light-receiving surface) 142S of the light guide plate 142. When such touching occurs, for example, the FFC 114 may lie between a light-emitting surface 112F of the LED 112 and the side surface 142S of the light guide plate 142, and the amount of light entering the light guide plate 142 from the LED 112 may be reduced. By contrast, if an attempt is made to avoid such touching, the backlight unit 149 becomes disadvantageously large for the space of the FFC 114.

Thus, with a backlight unit 149 in which a string-like LED module mj as shown in FIG. 10 is mounted, there arises restriction on the design between the light-emitting surface 112F of the LED 112 and the side surface 142S of the light guide plate 142. Moreover, since the FFC 114 needs to be handled with care, manufacturing efficiency of the backlight unit 149 decreases.

The present invention has been devised under the above background. An object of the invention is to provide a backlight unit that allows the space between a light-emitting surface of a light-emitting element and a side surface of a light guide plate to be set freely and is easy to manufacture, and to provide a liquid crystal display device including the backlight unit.

Means for Solving the Problem

According to one aspect of the invention, a backlight unit comprises: a light-emitting unit including a plurality of mounting boards arranged side by side via a connection conductor, the mounting boards having mounted thereon a plurality of light-emitting elements arranged side by side; and a light guide plate for receiving light from the light-emitting unit. In the backlight unit, in a light-receiving surface of the light guide plate for receiving light from the light-emitting elements, a recess is formed for housing the connection conductor for connecting adjacent ones of the mounting boards arranged side by side.

With this structure, the connection conductor is housed in the recess without it making contact with the light-receiving surface of the light guide plate, and thus there is no restriction on the space between the light-receiving surface of the light guide plate and a light-emitting surface of the light-emitting elements. Accordingly, the space between the light-emitting surface of the light-emitting elements and the light-receiving surface of the light guide plate is freely set.

Housing the connection conductor in the recess of the light-receiving surface in the light guide plate allows locating of the position of the light-emitting unit with respect to the light guide plate, for example, the position of the light-emitting unit in the longitudinal direction of the light-receiving surface (that is, the recess serves a positioning function). Accordingly, improved fitting of the light-emitting unit with respect to the light guide plate is achieved.

Preferably, a connector to be connected to the connection conductor is formed only on a mounting surface of the mounting board on which the light-emitting elements are mounted.

Generally, the mounting surface of the mounting board opposes the light-receiving surface of the light guide plate. Thus, if the connector is formed on the mounting surface, the connection conductor is to come very close to the light-receiving surface. This allows the connection conductor, even a relatively short one, to be housed in the recess of the light-receiving surface. Moreover, if the connection conductor is to come very close to the light-receiving surface, it is easily housed in the recess of the light-receiving surface oppositely arranged. Thus, fitting of the light-emitting unit with respect to the light guide plate surely improves.

Moreover, a printed conductor for connecting between the connector to be connected to the connection conductor and the light-emitting elements is preferably formed only on the mounting surface of the mounting board.

With this structure, there is no need to form a printed conductor on a non-mounting surface which is a rear surface of the mounting board. That is, in the backlight unit, a mounting board is used of which one surface alone is subjected to printed conductor processing. In addition, with this structure, the cost of the mounting board is relatively low, and in turn, the cost of the backlight unit is cut down.

Moreover, a heat dissipation member is preferably attached on the non-mounting surface which is a surface opposite from the mounting surface of the mounting board on which the light-emitting elements are mounted.

As the light-emitting elements are driven, they generate heat, and the light-emitting elements themselves and the mounting board take on heat. However, with the heat dissipation member attached to the mounting board, the heat taken on by the light-emitting elements and the mounting board escapes to the heat dissipation member.

In particular, if the printed conductor for connecting between the connector and the light-emitting elements is formed only on the mounting surface, the non-mounting surface is a smooth surface, on which the heat dissipation member is easy to attach. Moreover, the smooth non-mounting surface makes close contact with the heat dissipation member at a relatively greater degree. Thus, the heat taken on by the light-emitting elements and the mounting board escapes to the heat dissipation member efficiently.

Besides, the recess of the light-receiving surface in the light guide plate is preferably increasingly narrow away from the light-receiving surface.

In a case where the connection conductor flexes due to two mounting boards coming close to each other, the connection conductor tends to bulge from mounting surfaces to have a tapered shape. Then, if the recess is increasingly narrow away from the light-receiving surface, no excessive gap is created between the inner wall surface of the recess and the connection conductor. That is, the connection conductor is housed in the recess efficiently.

Moreover, the inclination angle of the inner wall surface of the recess of the light-receiving surface in the light guide plate is preferably the same angle as the maximum divergence angle of the light-emitting elements.

With this structure, light (outermost light) forming the maximum divergence angle of the light-emitting elements does not leak toward the recess after it has entered the light guide plate. Accordingly, the rate of effective utilization of light of the light-emitting elements increases.

Moreover, a main-light emission region for emitting main light included in the light emitted from the light guide plate is preferably located inward of the bottom of the recess.

With this structure, even if a dark region occurs near the light-receiving surface that faces the space between adjacent light-emitting elements in the mounting board, that dark region is not included in the main-light emission region. Accordingly, the light emitted from the main-light emission region does not contain uneven light amount.

According to another aspect of the invention, a liquid crystal display device comprises a backlight unit as described above and a liquid crystal display panel receiving light from the backlight unit.

Advantages of the Invention

According to the present invention, since the connection conductor for connecting the mounting boards is housed in the recess of the light-receiving surface in the light guide plate, there arises no restriction on the design between the light-emitting surface of the light-emitting elements and the light-receiving surface of the light guide plate, ascribable to the presence of the connection conductor.

Figure 1:
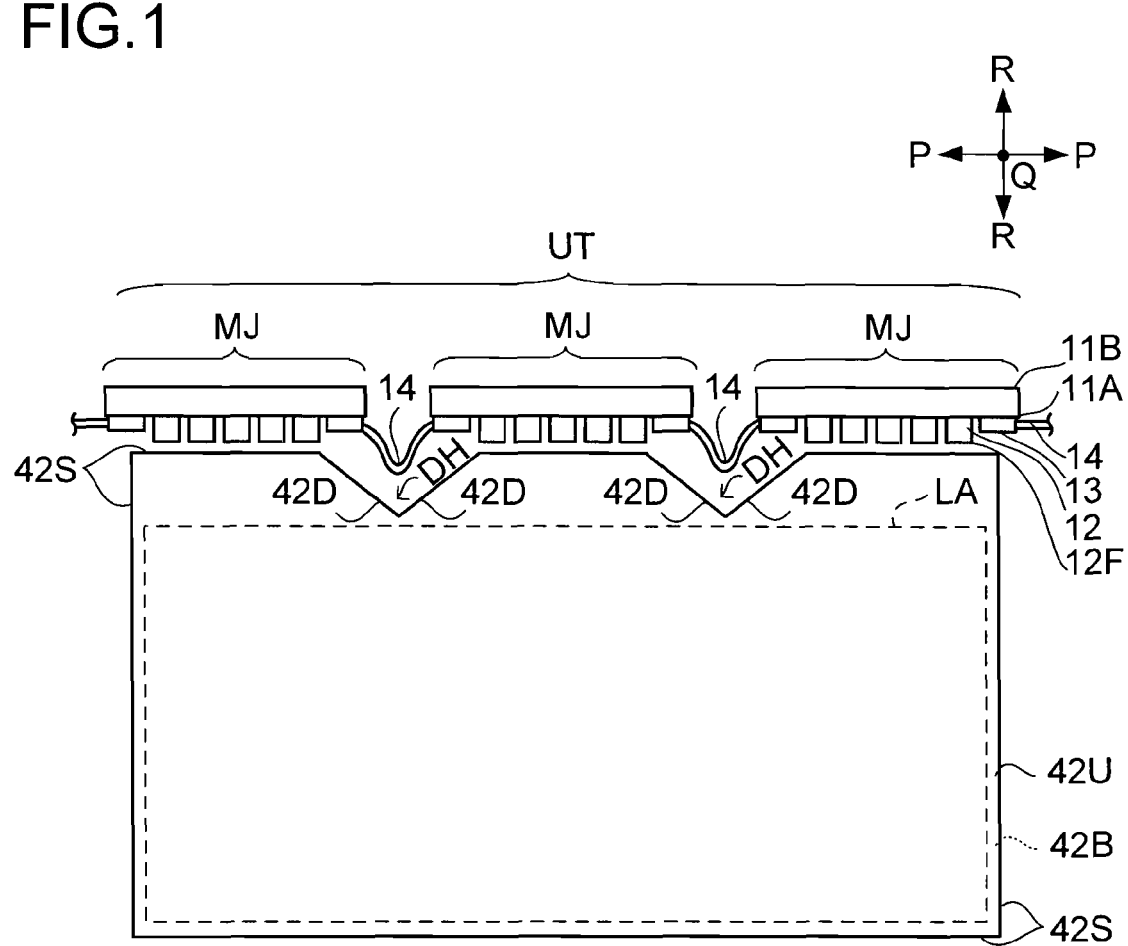
[FIG. 1] A plan view showing, by extracting, a light guide plate and LED modules in a backlight unit.

LIST OF REFERENCE SYMBOLS 11 mounting board
11A mounting surface
11B non-mounting surface
12 LED (light-emitting element)
12F light-emitting surface of LED
13 connector
14 FFC (connection conductor)
41 heat dissipation member
42 light guide plate
42U top surface
42B bottom surface
42S side surface
DH recess
42D inner wall surface of recess
43 reflective sheet
44 diffusive sheet
45 optical sheet
46 optical sheet
47 stack of optical sheets
48 housing
49 backlight unit
59 liquid crystal display panel
69 liquid crystal display device

BEST MODE FOR CARRYING OUT THE INVENTION

[First Embodiment]

A first embodiment of the present invention will be described below with reference to the accompanying drawings. For convenience' sake, hatching, reference signs, etc. may occasionally be omitted, in which case another drawing is to be referred to. A solid black dot on a drawing denotes the direction perpendicular to the plane of the page.

Figure 7:
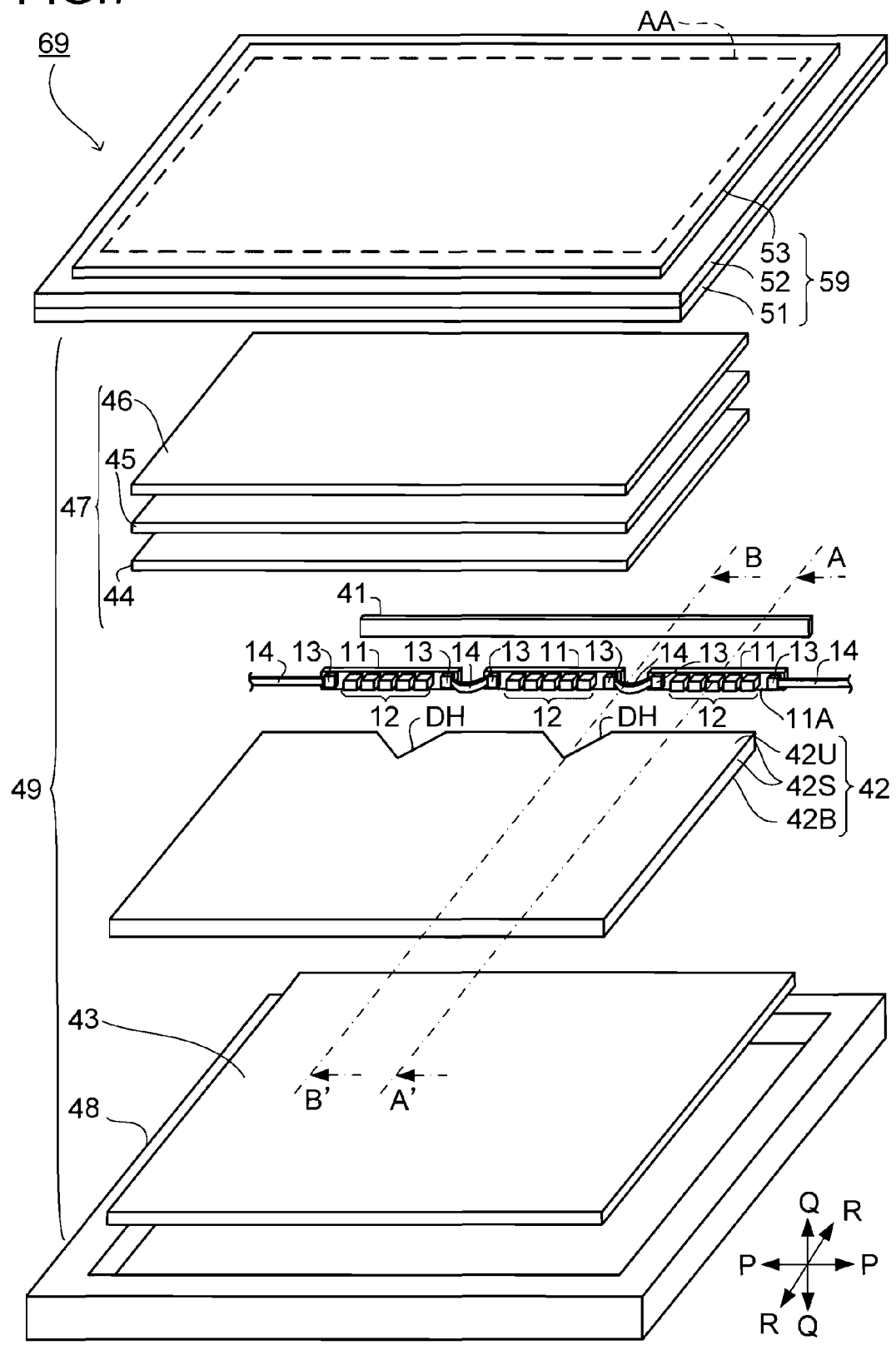
[FIG. 7] An exploded perspective view of a liquid crystal display device.
Figure 8A:
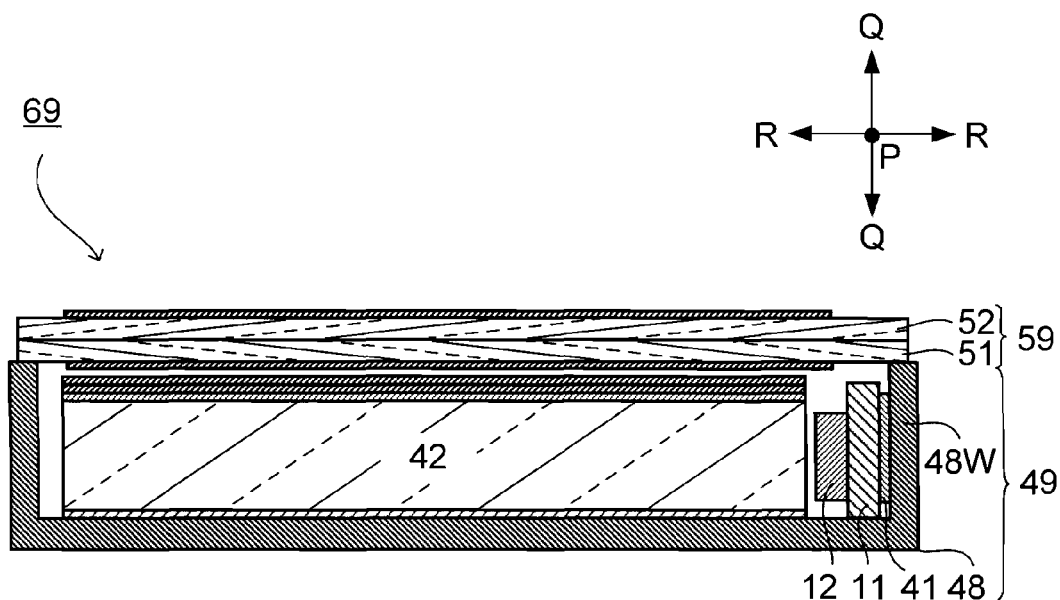
[FIG. 8A] A sectional view of the liquid crystal display device shown in FIG. 7, taken along line A-A' in FIG. 7 as seen from the direction indicated by arrows.
Figure 8B:
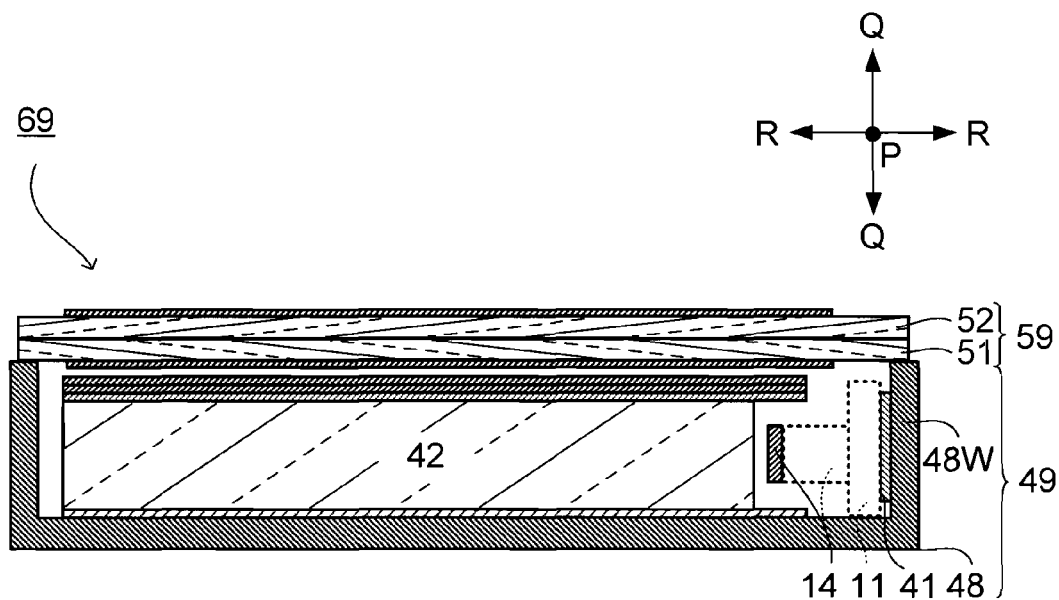
[FIG. 8B] A sectional view of the liquid crystal display device shown in FIG. 7, taken along line B-B' in FIG. 7 as seen from the direction indicated by arrows.
Figure 9:
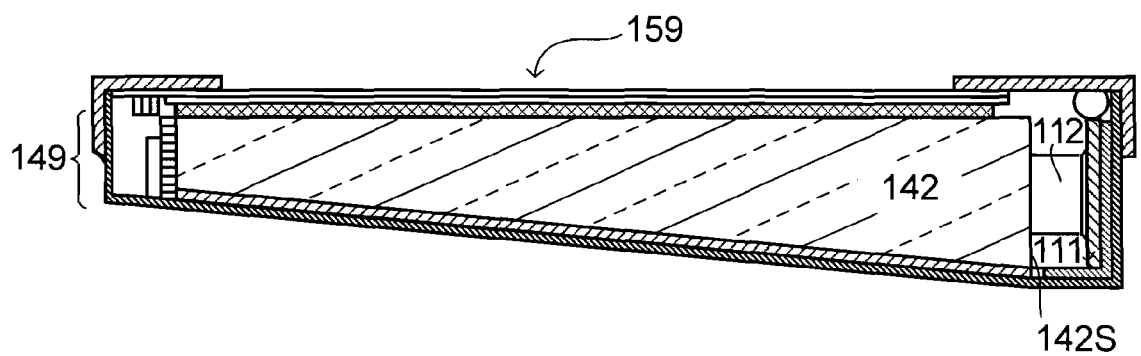
[FIG. 9] A sectional view of a conventional liquid crystal display device.
Figure 10:
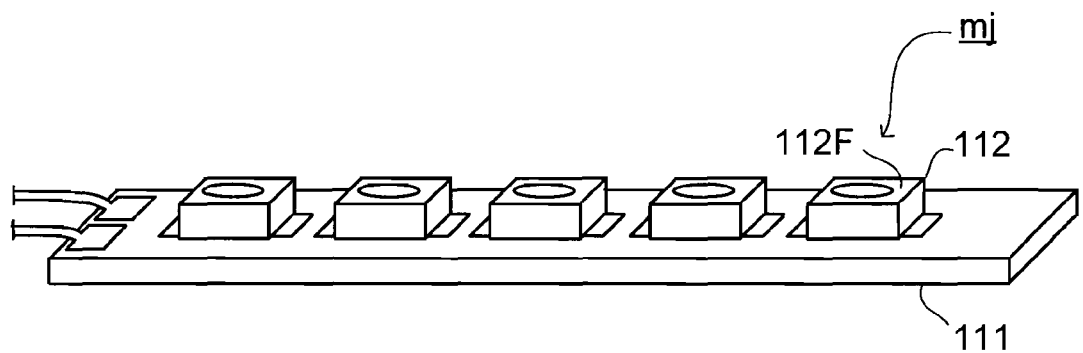
[FIG. 10] A perspective view of a mounting board on which LEDs are mounted.
Figure 11A:
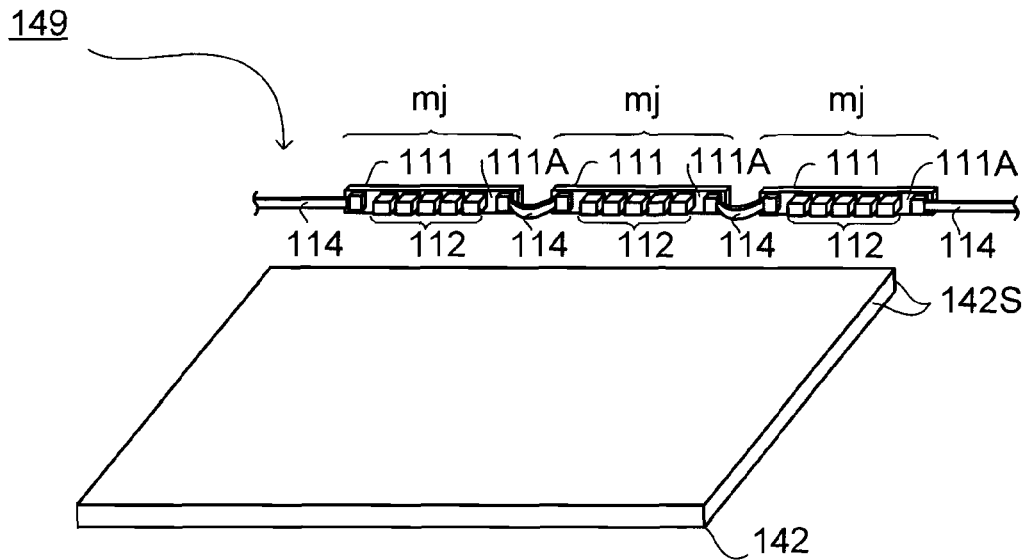
[FIG. 11A] A perspective view showing, by extracting, a light guide plate and LED modules in the conventional backlight unit.
Figure 11B:
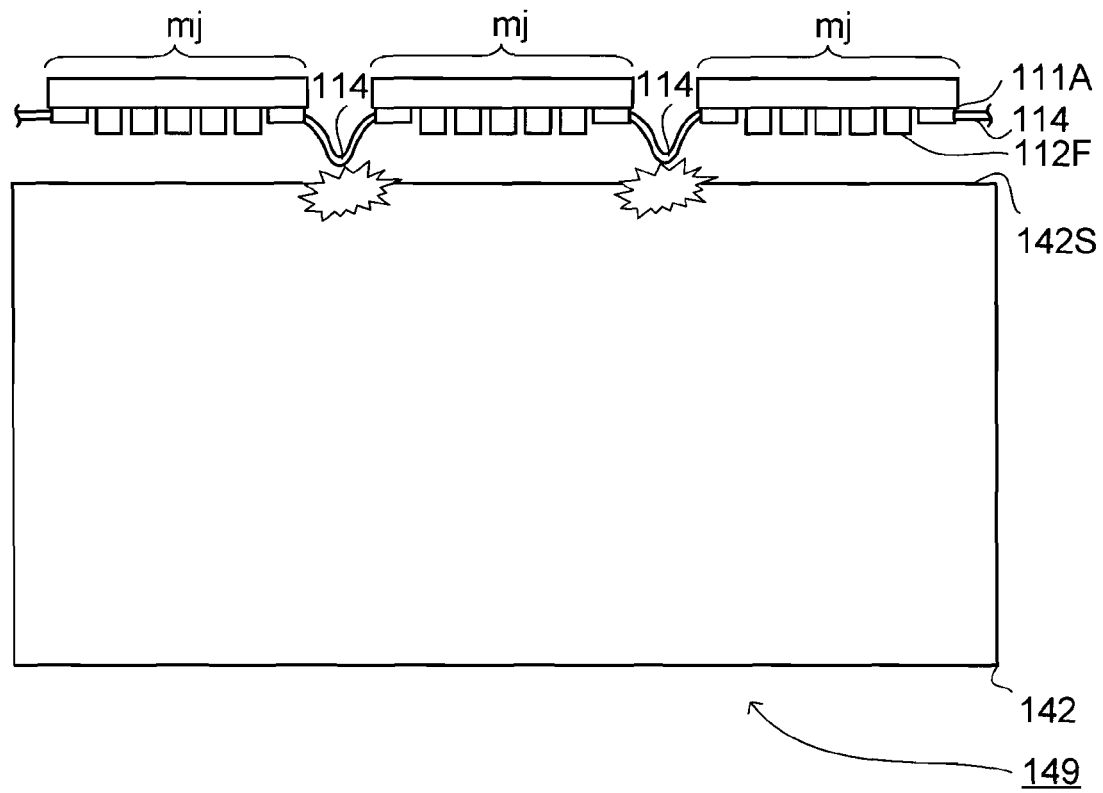
[FIG. 11B] A plan view of the light guide plate and the LED modules shown in FIG. 11A.

FIG. 7 shows an exploded perspective view of a liquid crystal display device 69. FIG. 8A is a sectional view of the liquid crystal display device 69 shown in FIG. 7, taken along line A-A' in FIG. 7 as seen from the direction indicated by arrows. FIG. 8B is a sectional view of the liquid crystal display device 69 shown in FIG. 7, taken along line B-B' in FIG. 7 as seen from the direction indicated by arrows. As shown in those diagrams, the liquid crystal display device 69 includes a liquid crystal display panel 59 and a backlight unit 49.

In the liquid crystal display panel 59, an active matrix substrate 51 that includes switching elements such as TFTs (thin film transistors) is bonded, with a sealing material (unillustrated), to an opposing substrate 52 that opposes the active matrix substrate 51. Then, the gap between the two substrates 51 and 52 is filled with unillustrated liquid crystal (note that, polarizing films 53 and 53 are so attached as to sandwich the active matrix substrate 51 and the opposing substrate 52).

The liquid crystal display panel 59 is a non-self-luminous display panel, and thus it exerts a display function by receiving light (backlight) from the backlight unit 49. Thus, if light from the backlight unit 49 irradiates the entire surface of the liquid crystal display panel 59 uniformly, the display quality of the liquid crystal display panel 59 improves. In the liquid crystal display panel 59, the area mainly viewed by the user is referred to as an effective display region AA (see FIG. 7).

The backlight unit 49 includes an LED module (light-emitting module) MJ, a heat dissipation member 41, a light guide plate 42, a reflective sheet 43, a diffusive sheet 44, optical sheets 45 and 46, and a housing 48.

The LED module MJ is a module that emits light. The LED module MJ includes a mounting board 11 having flexibility such as an FPC substrate (flexible printed circuit board), and an LED (light emitting diode) 12 that is mounted on an electrode of the mounting board 11 to thereby receive current supply and emits light.

Preferably, the LED module MJ includes a plurality of LEDs 12 to ensure light amount. Further preferably, the LEDs 12 are arranged side by side in a row on a mounting surface (support surface) 11A of the mounting board 11 (the number of the LEDs 12 is not limited). Note that, for the sake of convenience, the diagram shows only some of the LEDs 12 (hereinafter, the direction in which the LEDs 12 are arranged side by side will be referred to as the "arrange direction P").

The LED module MJ has a connector 13 at the ends of the mounting surface 11A in the mounting board 11. As the LED module MJ, a plurality of them are formed into a series with a flexible flat cable (FFC) 14 being connected to connectors 13 of every LED module MJ (note that, for the sake of convenience, the diagram shows only some of the LED modules MJ). The details of the LED modules MJ formed into a series will be described later.

The heat dissipation member 41 is attached to the rear surface (non-mounting surface 11B) of the mounting board 11 in the LED module MJ, and releases heat accumulated in the LEDs 12 and the mounting board 11 due to driving of the LEDs 12. The heat dissipation member 41 is adhesive, and is laid between the non-mounting surface 11B of the mounting board 11 and the housing 48 (specifically, an inner wall surface of a wall portion 48W in the housing 48). As a result, the heat dissipation member (adhesive member) 41 immobilizes the LED module MJ with respect to the housing 48.

The housing 48 is formed of a material with a relatively high thermal conductivity, and the heat accumulated in the LEDs 12 and the mounting board 11 escapes to the housing 48 via the heat dissipation member 41.

The light guide plate 42 is a plate-like member having side surfaces 42S, and top and lower surfaces 42U and 42B that are so located as to sandwich the side surfaces 42S. One surface (light-receiving surface) of the side surfaces 42S faces a light-emitting surface 12F of the LEDs 12 and receives light from the LEDs (light-emitting elements, point light sources) 12. The received light is mixed inside the light guide plate 42 so as to emerge from the top surface 42U as planar light. The details of the light-receiving surface 42S of the light guide plate 42 will be described later.

The reflective sheet 43 is so located as to be covered by the light guide plate 42. Besides, the surface of the reflective sheet 43 which faces the bottom surface 42B of the light guide plate 42 serves as a reflective surface. This reflective surface reflects the light from the LEDs 12 and light propagating inside the light guide plate 42 back into the light guide plate 42 without leakage (specifically, through the bottom surface 42B of the light guide plate 42).

The diffusive sheet 44 is so located as to cover the top surface 42U of the light guide plate 42, and diffuses the planar light from the light guide plate 42 so that the light shines the entire area of the liquid crystal display panel 59 (the diffusive sheet 44 and the optical sheets 45 and 46 are also collectively referred to as "the stack of optical sheets 47").

The optical sheets 45 and 46 are optical sheets that have, for example, a shape of prisms on their sheet surface so as to deflect light by affecting its radiating properties; the optical sheets 45 and 46 are so located as to cover the diffusive sheet 44. Thus, the optical sheets 45 and 46 converge the light traveling from the diffusive sheet 44 and thereby increases its luminance. The directions in which the light converged by the optical sheets 45 and 46 respectively diverge are in a mutually crossing relationship.

The housing 48 houses the LED module MJ, the reflective sheet 43, the light guide plate 42, the diffusive sheet 44, the optical sheets 45 and 46, etc. Specifically, the reflective sheet 43, the light guide plate 42, the diffusive sheet 44, the optical sheets 45 and 46 are stacked in this order to be housed in the housing 48 (hereinafter, the direction in which those members are stacked will be referred to as the "stack direction Q", and the direction perpendicular both to the arrange direction P of the LEDs 12 and to the stack direction Q will be referred to as the "direction R").

In the backlight unit 49 as described above, light from the LEDs 12 is emitted as planar light owing to the light guide plate 42. The planar light passes through the stack of optical sheets 47 to thereby be emitted as backlight with increased luminance. Then the backlight reaches the liquid crystal display panel 59 and, by the backlight, the liquid crystal display panel 59 displays images.

Figure 2:
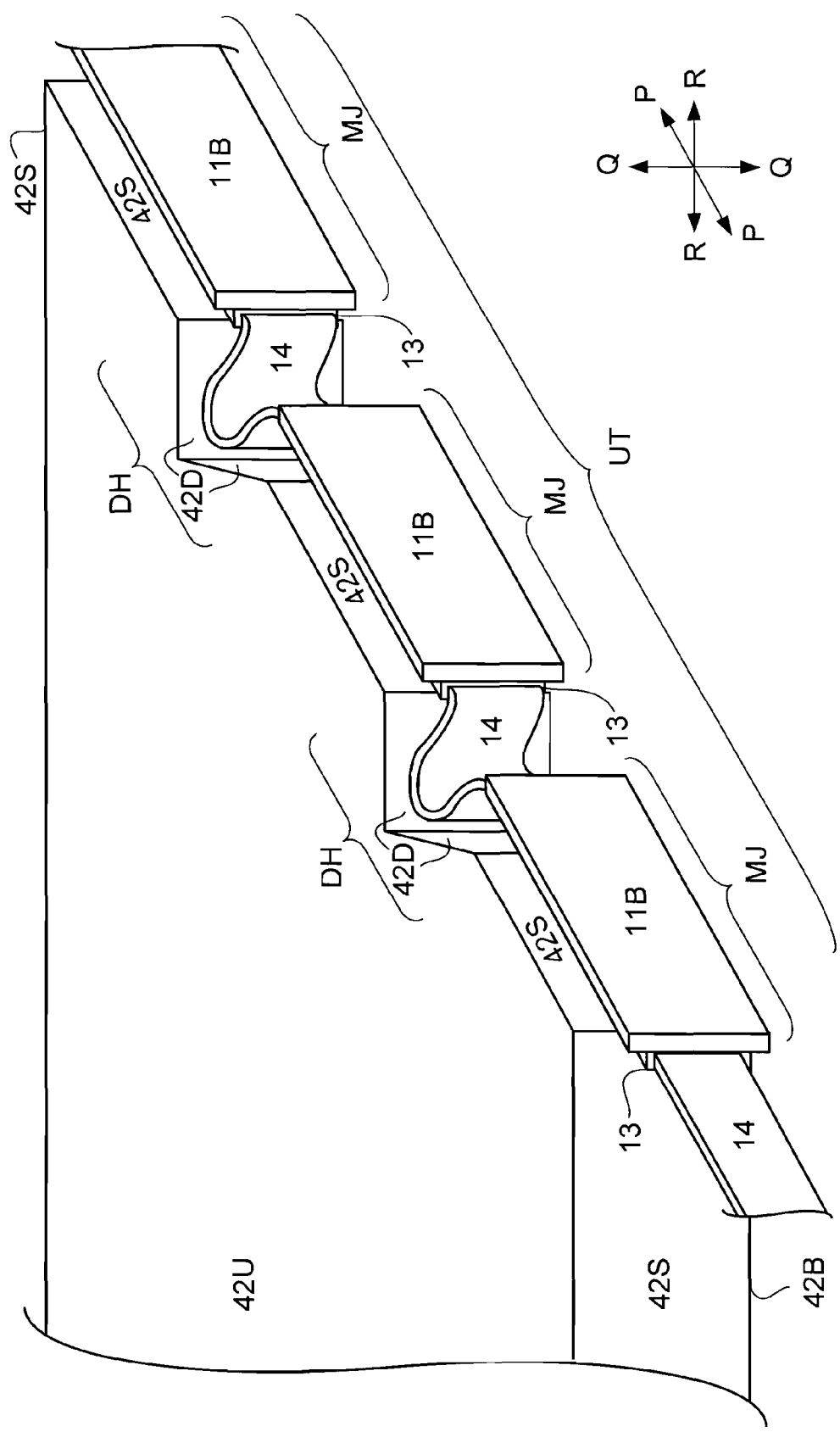
[FIG. 2] A perspective view of the light guide plate and the LED modules as seen from a non-mounting surface of a mounting board.

Here, the details of the light guide plate 42 and the LED module MJ will be described with reference to FIGS. 1 to 3. FIG. 1 is a plan view of the light guide plate 42 and the LED module MJ as seen from the top surface 42U of the light guide plate 42. FIG. 2 is a perspective view of the light guide plate 42 and the LED module MJ as seen from the non-mounting surface 11B of the mounting board 11.

Figure 3:
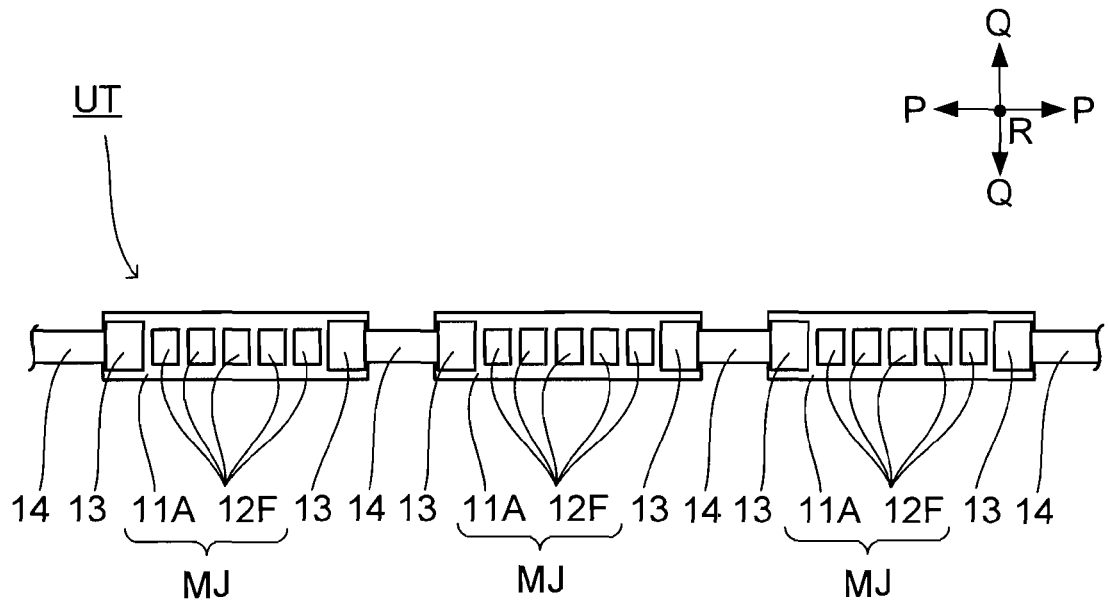
[FIG. 3] A plan view of the LED modules as seen from a mounting surface of the mounting board.

FIG. 3 is a plan view of the LED module MJ as seen from the mounting surface 11A of the mounting board 11 (the mounting surface 11A is a surface on which the LEDs 12 are mounted, and the non-mounting surface 11B is a surface opposite from the mounting surface 11A).

As shown in those diagrams, a light-emitting unit UT, namely the LED modules MJ formed into a series, includes a plurality of mounting boards 11 that are arranged side by side via the FTC (connection conductor) 14, the plurality of mounting boards 11 having mounted thereon a plurality of LEDs 12 that are arranged side-by-side. The light-emitting unit UT has the light-emitting surface 12F of the LEDs 12 facing one surface of the four side surfaces 42S of the light guide plate 42.

In the side surface (light-receiving surface) 42S of the light guide plate 42 that receives light from the light-emitting unit UT, a recess DH is formed. The recess DH is formed by a cut-out that goes down towards the side surface 42S which opposes the light-receiving surface 42S.

Specifically, two cuts that reach the top and bottom surfaces 42U and 42B of the light guide plate 42 are located, apart from each other, in the light-receiving surface 42S in its longitudinal direction (the arrange direction P), and those cuts approach from the light-receiving surface 42S toward the center of the light guide plate 42 to meet. As a result, a cut-out is created which serves as the recess DH in the light-receiving surface 42S.

The recess DH in the light-receiving surface 42S is located in a place that faces the FFC 14 in the light-emitting unit UT. Thus, as shown in FIGS. 1 and 2, when the light-emitting surface 12F of the LEDs 12 in the light-emitting unit UT and the light-receiving surface 42S of the light guide plate 42 face each other, even if the FFC 14 flexes, the flexed FFC 14 will be housed in the recess DH in the light-receiving surface 42S.

With this structure, the distance between the light-receiving surface 42S of the light guide plate 42 and the light-emitting surface 12F of the LEDs 12 is freely set without the restrictions of the flexed FFC 14. For example, a situation is prevented where the light-emitting surface 12F of the LEDs is excessively distant from the light-receiving surface 42S of the light guide plate 42 with a view to avoiding contacting of the flexed FFC 14 with the light-receiving surface 42S of the light guide plate 42. If the distance of the light-emitting surface 12F of the LEDs 12 relative to the light-receiving surface 42S of the light guide plate 42 is set relatively short, a compact backlight unit 49 is achieved.

Moreover, by housing the flexed FFC 14 in the recess DH of the light-receiving surface 42S in the light guide plate 42, it is possible to facilitate positioning of the light-emitting unit UT with respect to the light guide plate 42 in the arrange direction P and the stack direction Q. In other words, since the recess DH serves to position the light-emitting unit UT with respect to the light guide plate 42, improved fitting of the light-emitting unit UT with respect to the light guide plate 42 is achieved (in turn, the manufacturing efficiency of the backlight unit 49 improves).

Incidentally, if the FFC 14 is to be housed in the recess DH of the light-receiving surface 42S in the light guide plate 42 as described above, the connector 13 into which the FFC 14 is inserted is preferably formed on the mounting surface 11A of the mounting board 11.

With this structure, the FFC 14 comes very close to the light-receiving surface 42S, and, even if the FFC 14 is relatively short, it is housed in the recess DH of the light-receiving surface 42S. Moreover, if the FFC 14 is to come very close to the light-receiving surface 42S, it is easily housed in the recess DH of the light-receiving surface 42S oppositely arranged, and the fitting of the light-emitting unit UT with respect to the light guide plate 42 surely improves. Moreover, shorter FFC 14 is less expensive, which leads to reduced cost of manufacturing the backlight unit 49.

Moreover, even if the FFC 14 flexes toward the recess DH of the light-receiving surface 42S, the FFC 14 does not touch the mounting board 11, and scratching is prevented. Thus, for example, poor performance (such as conduction failure) of the light-emitting unit UT does not occur that is ascribable to a scratched FFC 14.

Furthermore, it is preferable that a printed conductor (unillustrated) for connecting between the connector 13 and the LEDs 12 be formed on the mounting surface 11A. In particular, a printed conductor for supplying current to the LEDs 12 is preferably formed only on the mounting surface 11A.

With this structure, printed conductor processing needs to be performed only on the mounting surface 11A in the mounting board 11, and furthermore, processing of a through hole etc. is not needed. This reduces the cost of the mounting board 11.

Moreover, since the printed conductor is formed only on the mounting surface 11A, the non-mounting surface 11B is a smooth surface. Then, when the heat dissipation member 41 lies between the non-mounting surface 11B of the mounting board 11 in the light-emitting unit UT and the housing 48, the heat dissipation member 41 makes close contact with the non-mounting surface 11B at a greater degree. As a result, heat accumulated in the LEDs 12 and the mounting board 11 efficiently escapes to the heat dissipation member 41.

Specifically, the degree of the heat dissipation member 41 making close contact with the smooth non-mounting surface 11B, is higher than, for example, that of the heat dissipation member 41 making close contact with the mounting surface 11A. This allows the heat accumulated in the LEDs 12 and the mounting board 11 to efficiently escape to the heat dissipation member 41 and in turn to the housing 48.

[Other Embodiment]

It should be understood that the present invention may be carried out in any manner other than specifically described above as an embodiment, and many modifications and variations are possible within the scope and spirit of the present invention.

For example, preferably, the recess DH in the light-receiving surface 42S of the light guide plate 42 is increasingly narrow away from the light-receiving surface 42S (preferably, the recess DH is tapered).

Generally, when the FFC 14 flexes due to two mounting boards 11 coming close to each other, the FFC 14 bulges (rises) from adjacent mounting surfaces 11A, and bends at or near the middle of the space between the two adjacent mounting boards 11A. Then, as shown in FIG. 1, a bent part in the FFC 14 and two connectors 13 for connecting the FFC 14 form a triangular shape (a taper shape).

Then, when the FFC 14 bent into a triangle shape approaches the light-receiving surface 42S of the light guide plate 42, it is efficiently housed in the taper-shaped (for example, triangular) recess DH (the point is, no excessive gap is created between the inner wall surface 42D of the recess DH and the FFC 14).

Figure 4:
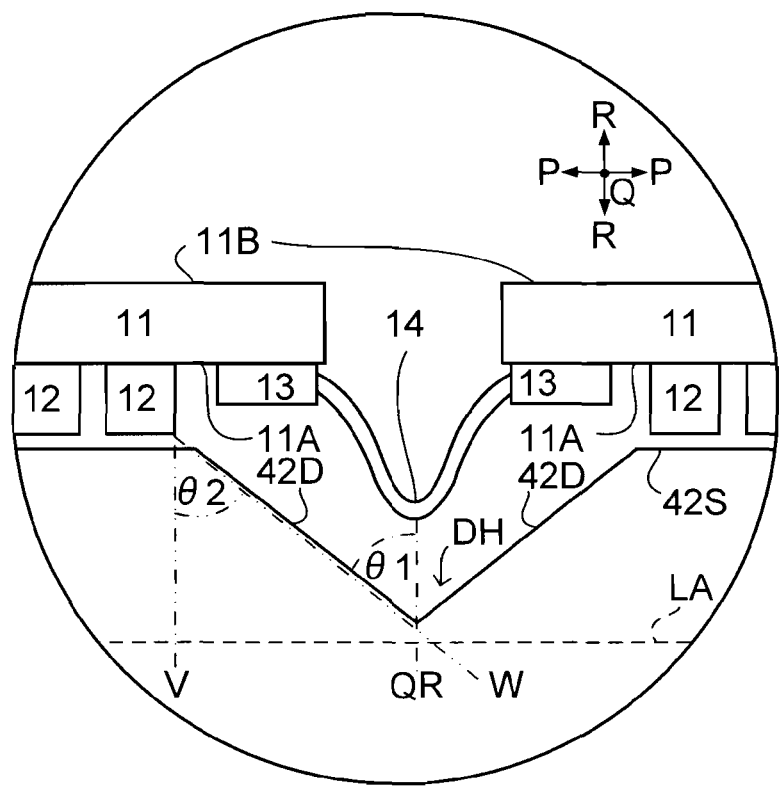
[FIG. 4] An enlarged view of FIG. 1.

Moreover, as shown in FIG. 4, which is an enlarged view of FIG. 1, the inclination angle $\theta 1$ of the inner wall surface 42D of the recess DH is preferably the same angle as the maximum divergence angle $\theta 2$ of the LEDs 12 ($\theta 1 = \theta 2$). The inclination angle $\theta 1$ is an angle formed by an imaginary surface (the QR plane formed by the stack direction Q and the direction R) and the inner wall surface 42D of the recess DH, the imaginary surface being perpendicular with respect to the light-receiving surface 42S, the top surface 42U, and the bottom surface 42B of the light guide plate 42.

The maximum divergence angle $\theta 2$ is an angle formed by the direction V (the same direction as the direction R) perpendicular to the light-emitting surface 12F of the LEDs 12 and an emission direction W of the outermost ray from the LEDs 12 (the outermost ray of the rays from the LEDs 12), in the PR plane formed by the arrange direction P and the direction R, when the LEDs 12 face the side surface 42S of the light guide plate 42.

When the inclination angle $\theta 1$ is the same angle as the maximum divergence angle $\theta 2$ as described above, if an LED 12 located at an end of the mounting board 11 and an end of the recess DH of the light-receiving surface 42S in the light guide plate 42 are adjacent to each other (if an edge of the inner wall surface 42D on the light-receiving surface 42S and an LED 12 located at an end of the mounting board 11 are adjacent to each other), light from the LEDs 12 does not leak toward the recess DH after it has entered the light guide plate 42. Thus, light from the LEDs 12 is used efficiently {the rate of light from the LEDs 12 entering the light guide plate to be utilized as backlight (the rate of effective utilization) improves}.

In a case where the light guide plate 42 is formed of poly methyl methacrylate (PMMA), the inclination angle θ1 and the maximum divergence angle θ2 may be, for example, approximately 42° (forty-two degrees). This value is obtained from the following calculation based on Snell's law (the refractive index of air is assumed to be 1, and that of the light guide plate 42 to be 1.51).

$$1.51 \times \sin X = 1 \times \sin 90°$$

$$\sin X = 1 \times \sin 90° / 1.51$$

$$\sin X = 1 \times 1/1.51$$

$$X = 42°$$

Figure 5:
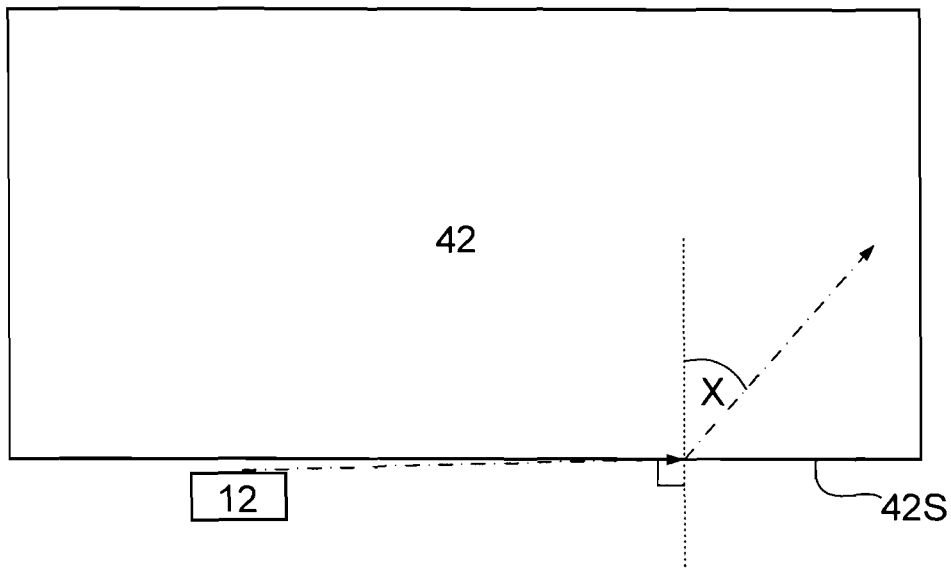
[FIG. 5] A plan view illustrating Snell's law.

As shown in FIG. 5, the formula calculates at what degree of an angle (the angle with respect to the side surface 42S) light travels in the light guide plate 42 in a case where light from the LEDs 12 is assumed to enter at approximately 90° (ninety degrees) with respect to the side surface 42S of the light guide plate 42. That is, in the light guide plate 42, it calculates at what degree of an angle at the maximum the light travels. Besides, if the value is approximately 42° (forty-two degrees), it means that so long as the inclination angle θ1 and the maximum divergence angle θ2 are approximately 42° (forty-two degrees), light from the LEDs 12 does not leak toward the recess DH after it has entered the light guide plate 42.

The fact that the light from the LEDs 12 does not leak toward the recess DH means that, even if the recess DH is filled with the material of the light guide plate 42, that region will be a dark region where no light from the LEDs 12 reaches. In other words, the recess DH is formed by removing a part to be the dark region from the light guide plate 42.

Figure 6:
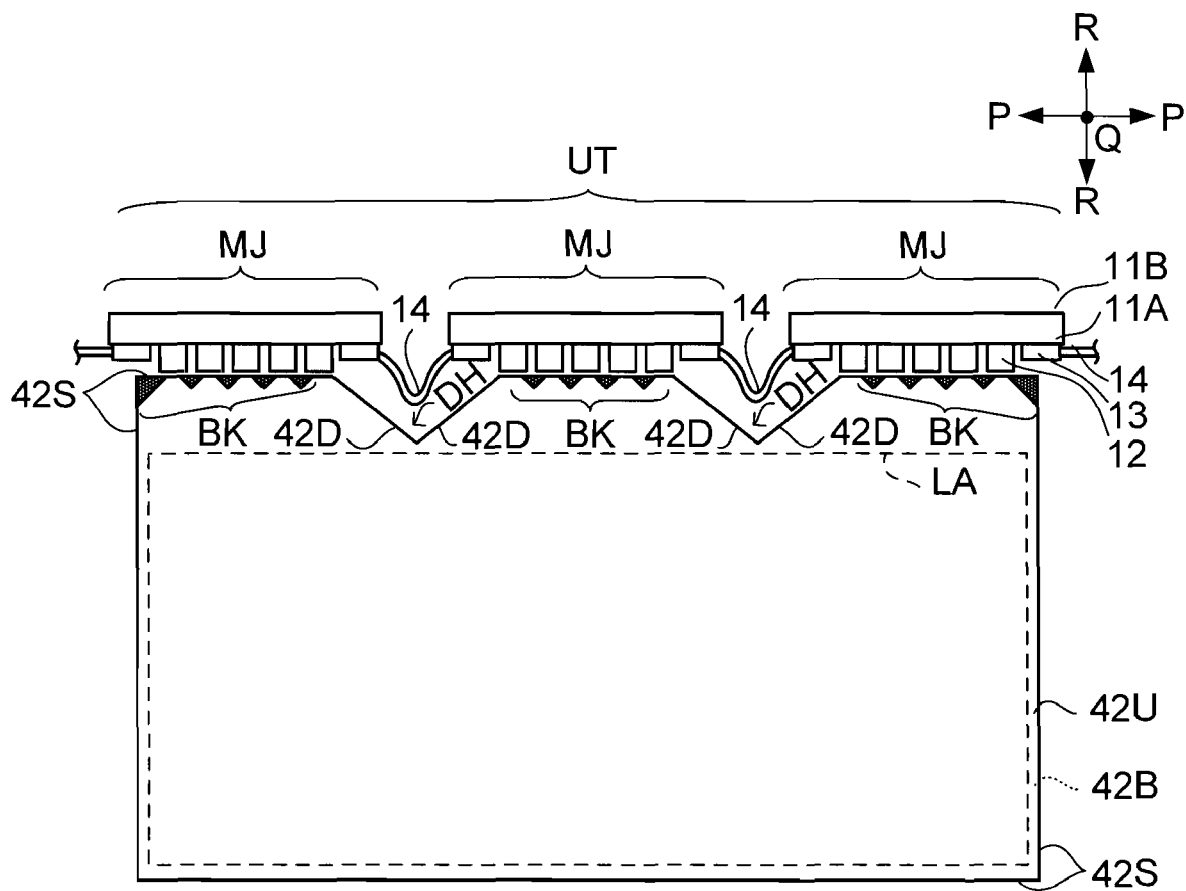
[FIG. 6] A plan view showing a state of occurrence of a dark region in the light guide plate shown in FIG. 1.

As shown in FIG. 6, parts near the light-receiving surface 42S that face the space between adjacent LEDs 12 in the mounting board 11 will be the dark region BK. However, the space between the adjacent LEDs 12 in the mounting board 11 is short compared with the space between adjacent mounting boards 11. Thus, the dark region BK is merely a very small region, and is not noticeable (the point is that light emitted from the backlight unit 49 does not contain uneven light amount ascribable to the dark region).

Furthermore, in the light guide plate 42, a region LA (a main-light emission region LA; see FIGS. 1 and 6) for supplying light to the effective display region AA in the liquid crystal display panel 59 preferably does not include the dark region BK. For this reason, it is preferable that the main-light emission region LA for emitting main light included in the light emitted from the light guide plate 42 be located, for example, inward of the bottom of the recess DH of the light-receiving surface 42S (i.e., a part on the side of the side surface 42S that opposes the light-receiving surface 42S).

In this way, the recess DH and the dark region BK near the light-receiving surface 42S that faces the adjacent LEDs 12 in the mounting board 11 are not included in the main-light emission region LA. Therefore, light emitted from the backlight unit 49 is surely prevented from containing uneven light amount.

The invention claimed is:

1. A backlight unit comprising:
a light-emitting unit including a plurality of mounting boards on which a light-emitting element is mounted, the plurality of mounting boards arranged side by side and connected via a connection conductor; and
a light guide plate arranged to receive light from the light-emitting unit; wherein
a light-receiving surface of the light guide plate arranged to receive light from the light-emitting element includes a flat surface and a recess arranged to recede inward from the flat surface;
the light emitting element is arranged to oppose the flat surface; and
the connection conductor is arranged within the recess.

2. The backlight unit according to claim 1,
wherein a connector to be connected to the connection conductor is provided on a mounting surface of the mounting board on which the light-emitting element is mounted.

3. The backlight unit according to claim 1,
wherein a printed conductor arranged to provide a connection between a connector to be connected to the connection conductor and the light-emitting element is provided only on a mounting surface of the mounting board on which the light-emitting element is mounted.

4. The backlight unit according to claim 1,
wherein a heat dissipation member is attached to a non-mounting surface which is a surface opposite from the mounting surface of the mounting board on which the light-emitting element is mounted.

5. The backlight unit according to claim 1,
wherein the recess in the light-receiving surface becomes increasingly narrow with increasing distance away from the light-receiving surface.

6. The backlight unit according to claim 5,
wherein an inclination angle of an inner wall surface of the recess is a same angle as a maximum divergence angle of the light-emitting element.

7. The backlight unit according to claim 1,
wherein a main-light emission region arranged to emit main light included in light emitted from the light guide plate is located inward from a bottom of the recess.

8. A liquid crystal display device comprising:
the backlight unit according to claim 1; and
a liquid crystal display panel receiving light from the backlight unit.

9. A liquid crystal display device comprising:
the backlight unit according to claim 2; and
a liquid crystal display panel receiving light from the backlight unit.

10. A liquid crystal display device comprising:
the backlight unit according to claim 3; and
a liquid crystal display panel receiving light from the backlight unit.

11. A liquid crystal display device comprising:
the backlight unit according to claim 4; and
a liquid crystal display panel receiving light from the backlight unit.

12. A liquid crystal display device comprising:
the backlight unit according to claim 5; and
a liquid crystal display panel receiving light from the backlight unit.

13. A liquid crystal display device comprising:
the backlight unit according to claim 6; and
a liquid crystal display panel receiving light from the backlight unit.

14. A liquid crystal display device comprising:
the backlight unit according to claim 7; and
a liquid crystal display panel receiving light from the backlight unit.

15. A backlight unit comprising:
a light-emitting unit including a plurality of mounting boards on which a light-emitting element is mounted, the plurality of mounting boards arranged side by side and connected via a connection conductor; and
a light guide plate arranged to receive light from the light-emitting unit; wherein
a light-receiving surface of the light guide plate arranged to receive light from the light-emitting element includes a recess arranged to house therein the connection conductor to connect adjacent ones of the mounting boards arranged side by side; and
the recess in the light-receiving surface becomes increasingly narrow with increasing distance away from the light-receiving surface.

16. The backlight unit according to claim 15,
wherein an inclination angle of an inner wall surface of the recess is a same angle as a maximum divergence angle of the light-emitting element.

17. A liquid crystal display device comprising:
the backlight unit according to claim 15; and
a liquid crystal display panel receiving light from the backlight unit.

18. A liquid crystal display device comprising:
the backlight unit according to claim 16; and
a liquid crystal display panel receiving light from the backlight unit.

* * * * *